United States Patent [19]

Hou

[11] Patent Number: 4,921,337

[45] Date of Patent: May 1, 1990

[54] TELESCOPIC SIDE MIRROR

[76] Inventor: Mei-Wen H. Hou, No. 24, Lane 103, Kun Shan St., Ku Shan Tsun, Yung Kang Hsiang, Taiwan

[21] Appl. No.: 341,161

[22] Filed: Apr. 21, 1989

[51] Int. Cl.⁵ ............................................... G02B 5/08
[52] U.S. Cl. ..................................... 350/604; 350/632
[58] Field of Search ................ 350/604, 606, 615, 632

[56] References Cited
U.S. PATENT DOCUMENTS
3,820,877 6/1974 Moyes .................................. 350/604

Primary Examiner—Bruce Y. Arnold
Assistant Examiner—Jay Ryan
Attorney, Agent, or Firm—Morton J. Rosenberg; David I. Klein

[57] ABSTRACT

Telescopic side mirrors for a car which can be operated to extend laterally as the car towing a home mobile or the like and to restore as the car disconnecting the home mobile in telescopic fashion which comprises a first side mirror of usual in shape, a second side mirror adapted to move with respect to the first side mirror in a telescopic fashion, a driving mechanism engaging the second side mirror and a control mechanism for automatically stopping the second side mirror as the second side mirror reaching its passage terminations.

1 Claim, 5 Drawing Sheets

TELESCOPIC SIDE MIRROR

BACKGROUND OF THE INVENTION

This invention relates to a driving mirror for a motor-car, and particularly to a telescopic side mirror for a car towing a trailer such as a camper or home mobile.

Nowadays, travelling with a car towing a camper or mobile home for staying overnights is popular. Said car usually needs extra side mirrors to enable the driver to see what is behind his car as the views from original driving mirrors such as rearview mirrors and side mirrors are entirely shaded by the trailer. Said extra side mirror usually includes a pyramid steel frame 7 laterally mounted on an upper portion of a fender and a mirror 8 adjustably secured to tip end of the frame 7. It is found to be disadvantageous that installations of the extra side mirrors increase the size of the car so that it becomes inconvenient or even impossible for parking it in its garage, and the extra side mirrors should be removed after disconnection with its trailer for security reasons.

SUMMARY OF THE INVENTION

It is, therefore, an object of this invention to obviate such prior disadvantages by providing telescopic mirrors for installing on a body of a car in a usual way for selective usage mainly according to connecting or disconnecting with a trailer.

This and other objects, such as will be apparent hereinafter, are achieved by a telescopic side mirror according to the characterizing clause of the appended claim.

DETAILED DESCRIPTION OF THE PREFERRED EMBODIMENT

Figure 1:
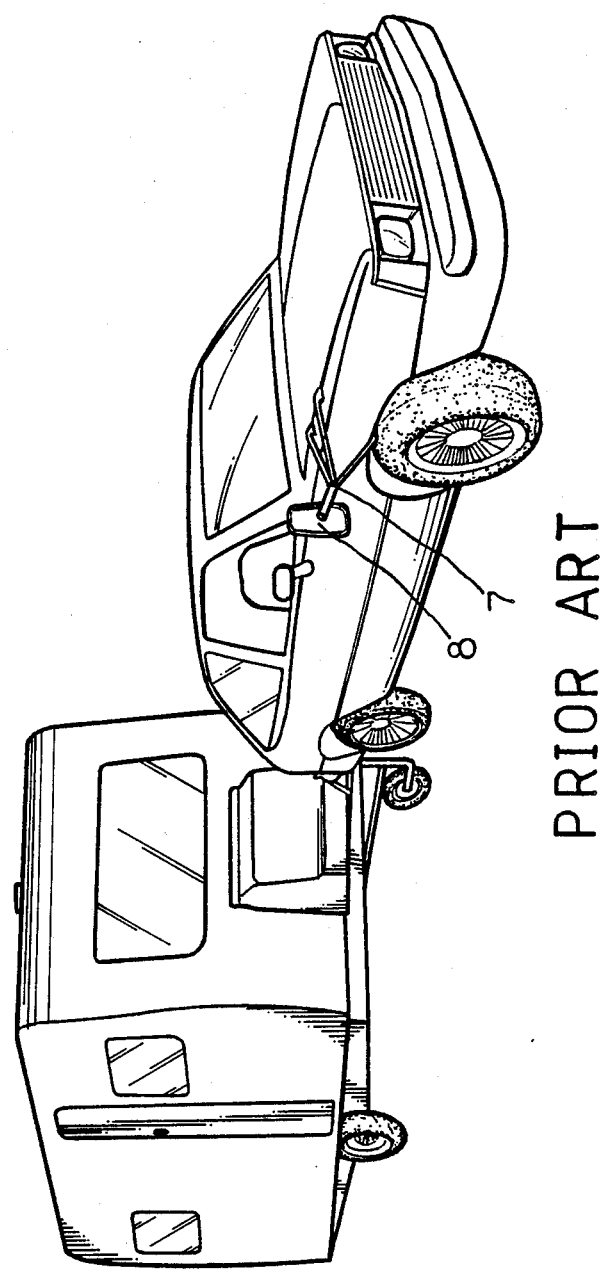
FIG. 1 is a perspective view showing a conventional extra side mirror installed in car which is towing a home mobile.
Figure 2:
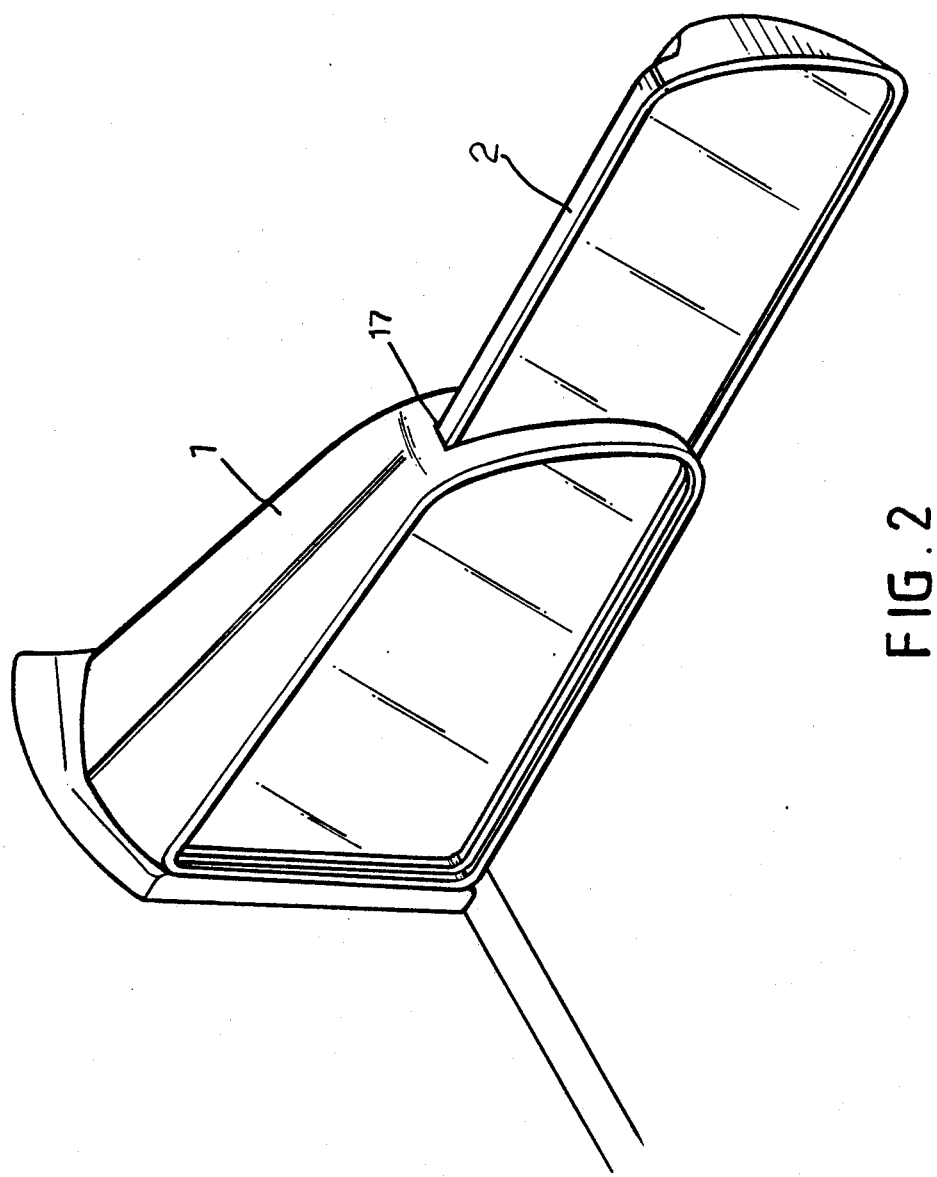
FIG. 2 is a perspective view of a preferred embodiment of this invention which is in extending condition.

Referring to FIG. 2, a telescopic side mirror for a car includes a first side mirror 1 and a second side mirror 2 adapted to move within the first side mirror 1 in a telescopic fashion through a side opening 17 formed in frame of the first side mirror 1.

Figure 3:
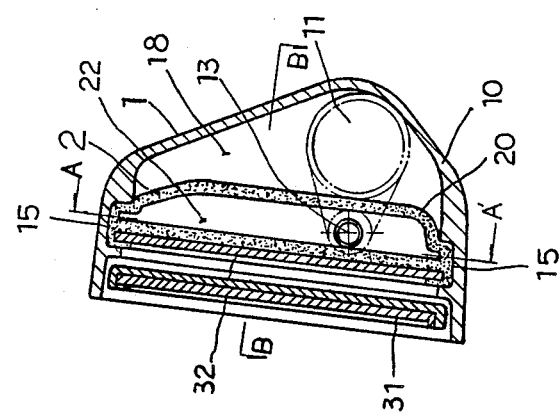
FIG. 3 is a cross-sectional view of a preferred embodiment of this invention which is in telescoped condition.
Figure 4:
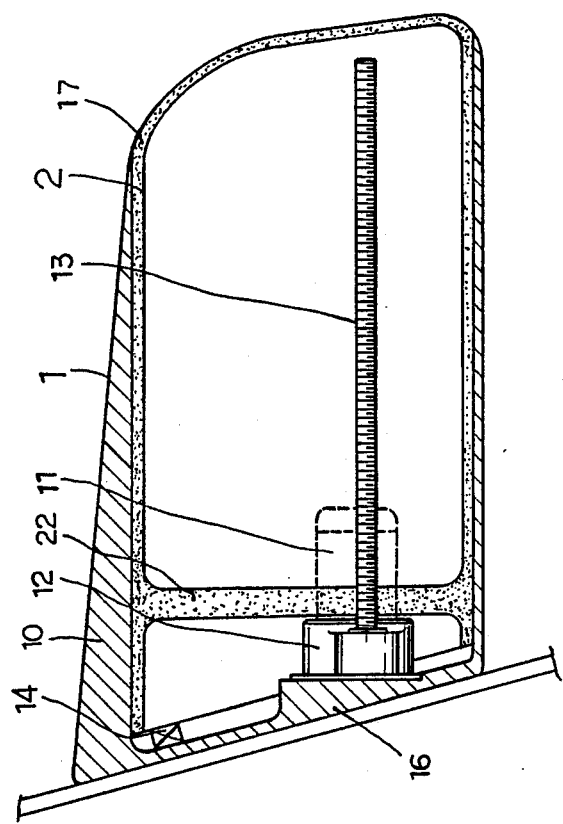
FIG. 4 is a cross-sectional view along line A—A' of FIG. 3.
Figure 5:
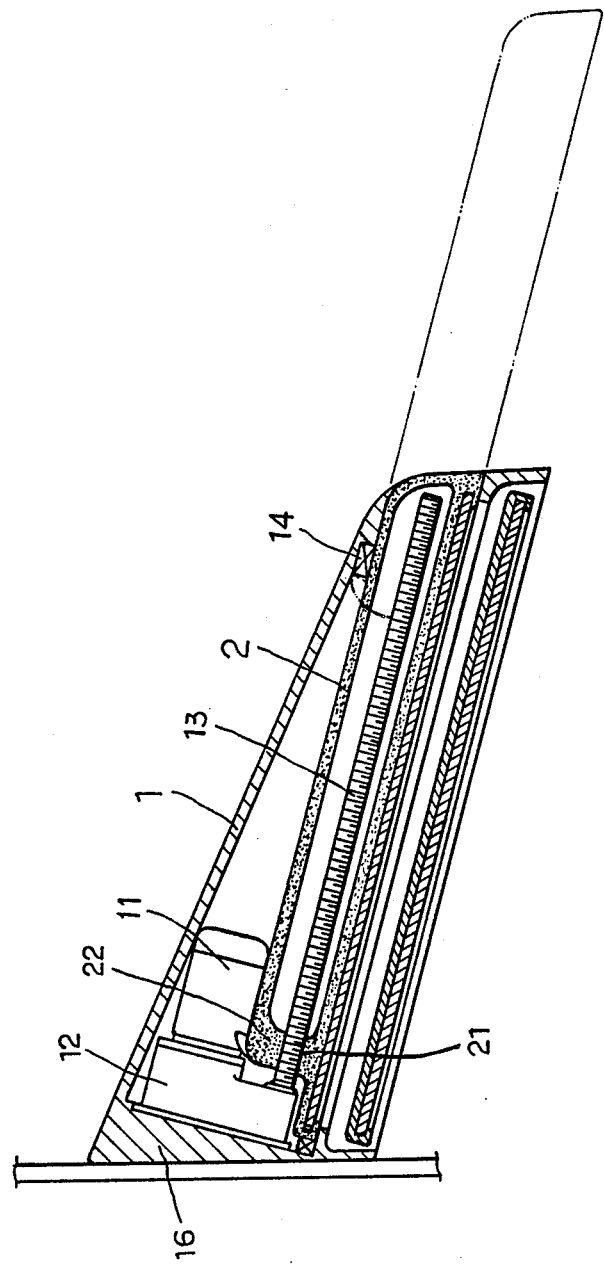
FIG. 5 is a cross-sectional view along line B—B' of FIG. 3.

The first side mirror 1, as shown in FIGS. 3, 4 and 5, comprises a frame 10 generally of vessel shape having an inner space 18 and an open or recess side for fitting a first mirror 31 which normally faces rearwards as the frame 1 is installed on a car, the side opening 17 mentioned above, formed in a side wall of the frame 10 opposed to the side secured to car and opposed inner grooves 15 running parallel to each other, terminating in the side opening 17 and formed in the inner side walls in the inner space 18.

The second side mirror 2 comprises a frame 20 having opposed sides adapted to be slidably engaged in the grooves 15, an open or recess side for fitting a second mirror 32 which also normally faces rearwards as the telescopic side mirror of this invention is properly mounted on a car, and a partition rib 22 extending transverse to and positioned between the grooves 15 and having a hole 21 with inner thread.

A driving mechanism laterally mounted on a seat 16 formed within the first frame 10 which includes an elongated nut 13 extending parallel to and positioned between the grooves 15 and driven to rotate by a motor 11, which can be controlled to rotate either clockwise or counterclockwise through a reduction gears assembly 12. The partition rib 22 is mounted on the elongated nut 13 through hole 21 wherein the inner thread of the hole 21 intermeshes with the thread of the nut. Limit switchs 14 are spacedly provided in the passage of the second side mirror 2 for back and forth terminations auto stop controls.

Figure 6:
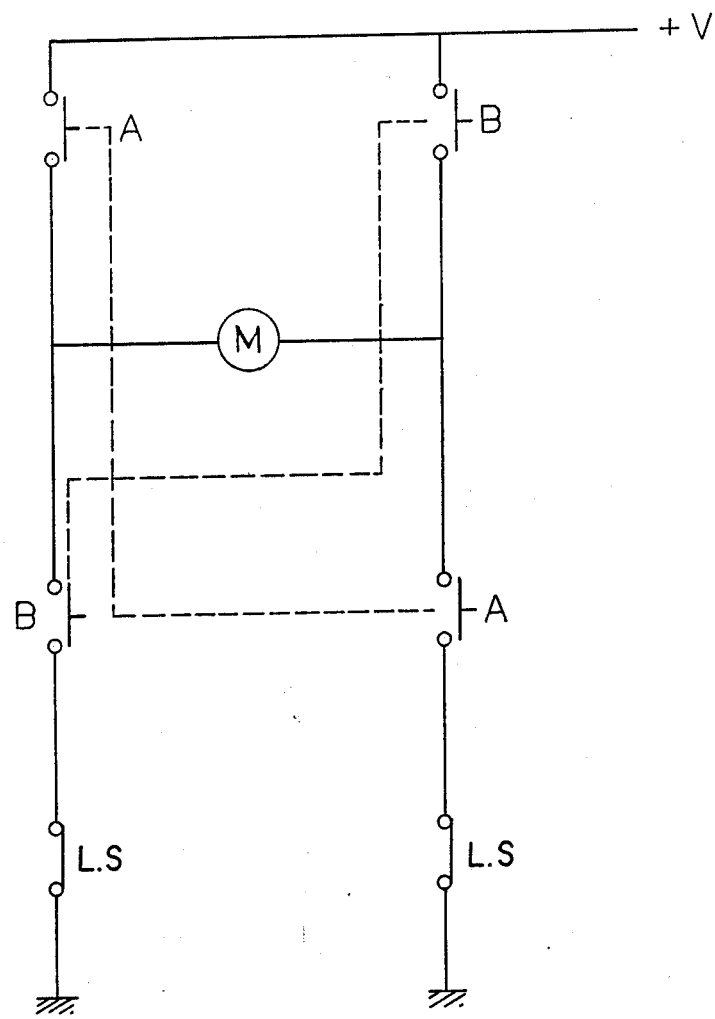
FIG. 6 is a control circuit of this invention.

In operation, the nut 13 can be driven to rotate in a direction so that the second side mirror 2 will extend outwardly with respect to the first side mirror 1 or in a reverse direction so that the second side mirror 2 will slide inwardly into the first side mirror. Said back and forth movements in a telescopic fashion will stop automatically as the frame 20 contacts each of the limiting switch 14. Said operation control can be achieved by means of a control circuit as shown in FIG. 6.

What is claimed is:

1. A telescopic side mirror for a car comprises:
   a first side mirror unit having a vessel-shaped frame having a first side adapted to be secured on a car, a second side opposed to the first side having an opening, a third opening or recessed side, an inner space and parallel grooves extending from the first side to the second side, and terminating in the opening and a first mirror fitted in the third opening or recessed side of the frame;
   a second side mirror unit having a frame adapted to telescope within the first side mirror through the opening thereof, having opposed sides adapted to be slidably engaged in the grooves, a driven member having a hole with inner threads, and a second mirror fitted in the frame thereof and facing a direction the same as the direction of the first mirror;
   driving means fixed in the inner space of the first frame having a rotation nut member extending parallel to the grooves, driven to rotate clockwise or counterclockwise by a power unit and engaging the driven member of the second side mirror by means of intermeshable threads; and
   control means for controlling said clockwise or counterclockwise rotation of the power unit.

* * * * *